July 19, 1938.　　　D. B. NUTT　　　2,124,148
REMOVAL OF SUSPENDED SOLIDS FROM OIL
Filed Nov. 18, 1935
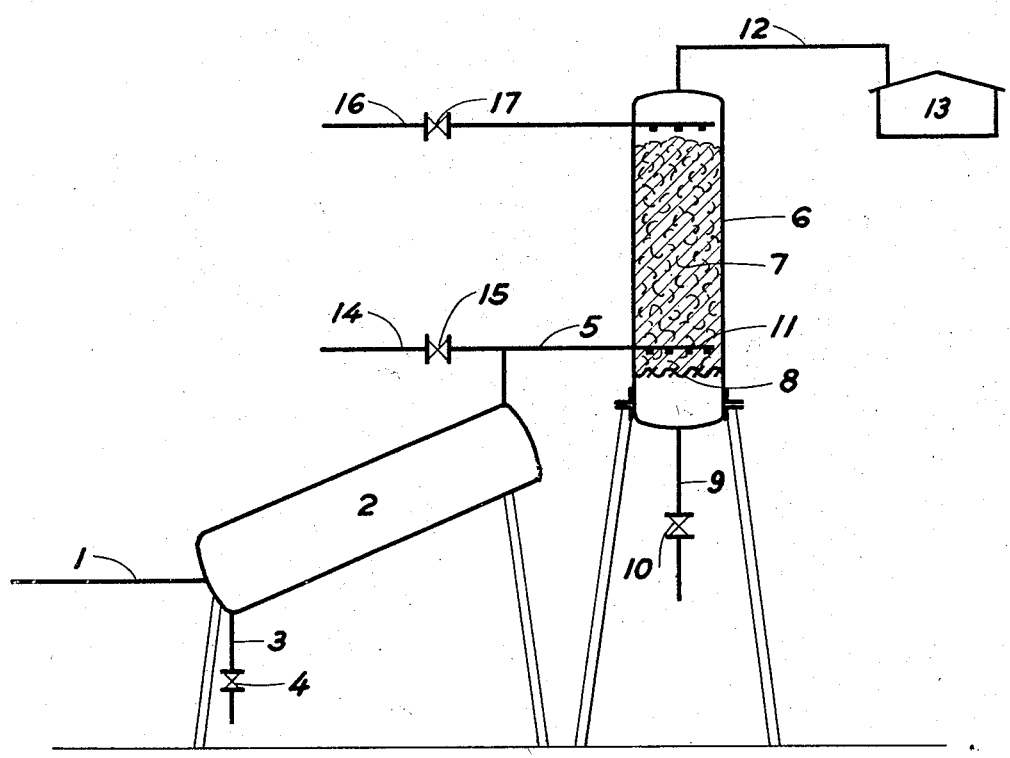
Inventor
DONALD B. NUTT
by *J. K. Adams*
　　Attorney Patented July 19, 1938

2,124,148

UNITED STATES PATENT OFFICE 2,124,148

REMOVAL OF SUSPENDED SOLIDS FROM OIL

Donald B. Nutt, El Segundo, Calif., assignor to Standard Oil Company of California, San Francisco, Calif., a corporation of Delaware Application November 18, 1935, Serial No. 50,415

6 Claims. (Cl. 196—147)

This invention relates to a method of treating oil to remove particles of solid matter carried in suspension therein.

It is well known that petroleum oils, particularly light distillates, both straight run and those derived from thermal cracking operations, are often subjected to treatment with reagents which introduce finely divided solids into the treated oil. For example, such oils may be treated with sodium plumbite solution and sulfur, or directly with a suspension of lead sulfide in caustic soda solution. Such treatment improves the odor of the oil by converting mercaptans to oil-soluble disulfides which have an unobjectionable odor. It is customary, in treating oils with such reagents, to follow the contacting step with a settling step (for example, the oil containing suspended matter may be passed through a zone of low velocity wherein the major portion of the suspended matter settles out by gravity).

The supernatant oil, even in plants provided with a relatively very large settling capacity, is found to contain a material quantity of extremely finely divided reagent and sulfide particles in suspension. This suspended matter may be removed by water washing, but such method entails serious practical disadvantages. Among those disadvantages may be mentioned the tendency to wash out the reagent liquid only, without effecting complete removal of the very minute, even colloidal, solid particles, allowing such particles to remain suspended in the oil. Other disadvantages of the washing method are the increased cost due to water pumping and equipment, the tendency to emulsion formation (resulting in oil loss), and the necessity for drying the water washed oil.

An alternative method of removing these suspended materials is to pass the oil containing such suspension through a filter. The disadvantages of this procedure are obvious.

Various well known treating methods, other than those mentioned above, introduce finely divided solids into the treated oil, and present the same problem of clean separation. Among these may be mentioned treatment of light oils with aqueous caustic solution containing powdered charcoal or metallic (lead, cobalt or nickel) sulfide, and nickel sulfide in ammonia.

I have discovered a method whereby such difficultly removable suspended solids may be separated from oils in a continuous manner without suffering any of the disadvantages attendant upon the known methods of removal. This I accomplish by passing the oil containing finely divided material in suspension through a bed of solid insoluble coarse material such as crushed rock, loosely packed and coated with an aqueous film. If the bed is of sufficient size as compared with the volume of oil to be passed over it, the oil delivered from such bed will be entirely dry and free from foreign matter. No water washing or filtration or other procedure is then necessary. Moreover, the reagent removed by this bed is in such condition that it may be, if desired, restored directly to an efficient treating agent by any of the well known reclaiming processes. The bed is so constructed as to remove all of the suspended matter. In accordance with my invention the bed is so constructed as to afford relatively large voids or passageways for the oil, such that long continued operation will not result in the clogging of the bed with arrested solids. Furthermore, the aqueous film or coating material on the surfaces of the packing of the bed, in addition to its function of entrapping solid particles from the oil stream, acts to maintain the continued free flow of oil by its tendency to drain out slowly by gravity, carrying with it accumulated solids. It is evident, therefore, that my invention is not to be confused with filtration, wherein the solids are removed by straining through a mesh, the passages or voids of which are in effect smaller than the solid particles.

As previously stated, it is necessary, according to my invention, that the bed be coated with an aqueous liquid. Preferably I use a solution of caustic alkali. An aqueous solution of sodium or potassium hydroxide or sodium plumbite is particularly desirable. The coating may be formed by introducing the coating liquid in admixture with the incoming oil, or separately into the top of the bed, whereby it will run slowly down through the packing countercurrent to the oil. In practice, however, many of the treated oils which contain solids in suspension also contain finely divided droplets of caustic solution, e. g. in the case of "doctor" (sodium plumbite) treated oils. In such cases the caustic reagent supplies the necessary coating for the bed.

The action of the bed is, as I believe, as follows: The aqueous coating material (or the suspended reagent carried by the oil which flows through the bed) is retained preferentially by the solid surfaces of the bed, thus coating these surfaces with the desired liquid film. The suspended solid particles and additional droplets of added coating liquid or suspended reagent adhere to and are retained by this film. As the film increases in thickness, it tends to run off, carrying with it all of the particles which it contains. Thus the coating material continually drains toward the bottom of the bed, where a reservoir is provided, from which reservoir a draw-off line, controlled by a valve, permits the operator to remove it. Particles of sulfide or other solid, or droplets of sulfide-plumbite (or sulfide-caustic) suspended in oil, are not removable by a bed such as has been described above unless and until the surfaces of the bed have been coated with a film as described. Once this has been done, such a film will retain preferentially all particles and droplets which come in contact therewith. It is necessary, in order that all suspended matter may be removed, that the bed shall contain sufficient surface to insure contact with all of the suspended matter carried by the oil which passes through the bed. It is also necessary that the voids of the bed be of sufficient size as to preclude the eventual clogging of the bed by accumulated reagent, and also so as to preclude such a high oil velocity therethrough that portions of the reagent adhering to the surfaces within the bed will be swept off and carried along with the oil.

In order that the operation of my invention may be more clearly understood, reference may be had to the attached drawing, which represents diagrammatically one form of apparatus in which the invention may be carried out.

In the drawing, 1 represents a pipe line leading from a treating plant, not shown. The line 1 is connected as shown with one end of a settling vessel 2, the interior of which is free from packing or other obstruction. A pipe line 3 leads from the lowest point of the settler 2. The pipe line 3 is equipped with a valve 4. A pipe line 5 is connected with the upper portion of the settler 2 and leads into the lower portion of a vertical vessel 6. The pipe line 5 ends, within the vessel 6, in a suitable distributing head 11. The vessel 6 is equipped with a transverse foraminous grid or screen support 8, this grid being positioned at a point below the distributor head 11. Resting on the grid 8 is a loosely packed bed of crushed rock of sufficient depth to submerge and to extend a considerable distance above the distributor 11. This bed is indicated in the drawing by the shaded area 7. The lowermost portion of the vessel 6 is equipped with a draw-off line 9 containing a valve 10. A clean oil exit line 12 leads from the upper portion of the vessel 6 to a storage tank 13. Line 14 equipped with a valve 15, and line 16 equipped with a valve 17, lead from a supply of caustic solution, not shown.

An example of operation of the equipment shown diagrammatically in the drawing is as follows: A mixture of oil containing in suspension sodium plumbite and lead sulfide flows through line 1 into the open settler 2. Within the settler 2 the velocity of the liquid is greatly decreased, permitting the major portion of the suspended matter to settle out by gravity. The material which settles out collects in the lower portion of the vessel 2 and is drawn off continuously or intermittently through line 3 by manipulation of valve 4. The material thus drawn off may be recycled for further use in contacting additional oil, or it may be stored or reclaimed, as desired. The liquid flowing from the vessel 2 through line 5 is oil containing finely dispersed droplets of plumbite and particles of lead sulfide. This contaminated oil enters the vessel 6 through the distributor head 11, which head is designed so as to distribute the liquid approximately uniformly over the cross-section of the vessel. The distributor 11 is not designed, however, to offer a high resistance to the flow of oil, or to atomize or spray the oil. As the oil works its way upwardly through the rock packing 7 it is brought into intimate contact with the rock surfaces to which, I have discovered, the minute droplets of plumbite solution will adhere. Thus in a short time the rock becomes coated with solution, which coating thenceforth collects and retains any particles of lead sulfide which may be carried by the oil flowing across such surface. The bed is of sufficient depth to insure the thorough contacting of all portions of the oil with the solid surfaces of the bed. The oil which leaves the vessel 6 through line 12 is found to be perfectly bright and free from suspended foreign matter. As the operation continues the bed becomes coated with more and more of the plumbite and a downward drainage of lead sulfide and plumbite takes place. The material thus draining downwardly collects in the lower portion of the vessel 6 and is drawn off continuously or intermittently through line 9 by manipulation of valve 10. The material flowing through line 9 may be combined with that flowing through line 3 previously described.

Although the above-described example of the operation of my invention related to the cleaning of an oil which had been "doctor treated", it would also apply to an oil containing suspended water, liquid caustic material and solid particles.

In the event the oil contains solids only, or in starting operation, the necessary bed coating is preferably established and maintained by admitting water or, preferably, caustic solution through line 16, valve 17, into the upper portion of the bed. Alternatively, this caustic may be introduced through line 14, valve 15, to the stream of oil on its way to the packed vessel 6. In the latter event, unless the turbulence in line 5 is unusually great, it is desirable to inject the material from line 14 into line 5 through an atomizing device in order to disperse it thoroughly in the oil.

Although the size and other details of construction of the apparatus, particularly the purifier 6, may be varied to suit the needs of individual cases, I have found that a satisfactory apparatus for the treatment of 45,000 gallons of cracked naphtha per hour is a 10 foot by 30 foot vertical drum packed with No. 4 rock to a depth, above the oil inlet 11, of about 18 feet.

Rock conventionally termed No. 3 rock, ranging from about ¼ to ¾ inch in diameter, may be used satisfactorily. The bed should not be formed of material finer than No. 4 rock, however. No. 4 rock will pass a ½ inch mesh sieve, 45% to 50% will pass ¼ inch mesh, not more than 2% to 3% will pass 1/16 inch mesh. If material finer than No. 4 is used (blast sand, for example), the voids are so small that considerable pressure is required to force the oil through the bed, and there is a tendency for the aqueous liquid and the solid particles to clog a large number of the voids, resulting in channelling and destroying, or greatly reducing, the desired drainage of caustic from the bed. A proper bed for my purpose is one containing 40% to 65% voids averaging from 0.003 to 0.06 square inch in cross-section.

It is not necessary that rock be used as packing for the vessel 6. Other insoluble and non-reactive solids preferentially wetted by water or caustic may be used, e. g., broken glass, brick or pottery.

The settler 2, shown in the drawing as inclined at about 30°, may, of course, be placed in a vertical or horizontal position. Likewise, the vessel 6 may be in a position other than vertical, although the vertical position is preferred as it is convenient and has a large throughput capacity for a given quantity of rock.

Having thus described my invention, I claim:

1. A method of removing finely divided solid particles from oil comprising passing the oil containing solids in suspension through the voids in a bed of solid insoluble material, such voids being very large relative to the size of the solid particles, and maintaining the surfaces of the said solid material coated with aqueous alkaline solution.

2. A method of removing finely divided solid particles from oil comprising passing the oil containing such particles in suspension through the voids of a bed of solid material insoluble in oil and water, said voids being sufficiently larger than the suspended particles as to preclude clogging thereof by accumulations of solid particles, maintaining the surfaces of said solid material coated with an aqueous alkaline solution.

3. A method of treating oil containing in suspension aqueous alkaline solution and finely divided solid particles, comprising passing such oil in contact with extended surfaces of solid insoluble material to coat said surfaces with a film of aqueous alkaline solution and retain said solid particles in said film.

4. A method of removing finely divided solid particles from oil comprising passing the oil through the voids of a bed of solid material insoluble in oil or caustic, said voids having an average cross-sectional area of from 0.003 to 0.06 square inch, maintaining the surfaces of the solids of said bed coated with aqueous alkaline solution.

5. A method of treating oil containing suspended solids comprising passing such oil in contact with extended surfaces of solid insoluble material coated with a film of aqueous alkaline solution, whereby the suspended solids are retained in said film.

6. A method of removing finely divided solid particles from oil comprising passing the oil containing solids in suspension through the voids in a bed of solid insoluble material, such voids being very large relative to the size of the solid particles, and maintaining the surfaces of the said solid material coated with sodium plumbite solution.

DONALD B. NUTT.